UNITED STATES PATENT OFFICE.

MELCHIOR BÖNIGER AND JAN LAGUTT, OF BASLE, SWITZERLAND, ASSIGNORS TO CHEMISCHE FABRIK, VORMALS SANDOZ, OF SAME PLACE.

BLUE TRISAZO DYE AND PROCESS OF MAKING SAME.

SPECIFICATION forming part of Letters Patent No. 652,456, dated June 26, 1900.

Application filed August 22, 1899. Serial No. 728,058. (Specimens.)

*To all whom it may concern:*

Be it known that we, MELCHIOR BÖNIGER and JAN LAGUTT, doctors of philosophy, chemists, residing at Basle, Switzerland, have invented new and useful Improvements in the Manufacture of Blue Trisazo Dyes, (for which patents have been applied for in Germany on April 12, 1899, No. C. 8,188, IV/22ᵃ; in Great Britain on April 22, 1899, No. 8,503, and in France on April 18, 1899, No. 287,971,) of which the following is a specification.

Our invention relates to the production of new trisazo dyestuffs dyeing unmordanted cotton in greenish-blue to dark-blue shades fast to alkalies. These new coloring-matters are produced by combining in an alkaline solution one molecule of a tetrazotized paradiamin with one molecule of the monoazo dye formed by coupling in a mineral-acid solution the diazodichlorbenzene 1.2.4 or 1.2.5 or 1.3.4 with 1.8 amidonaphtol 3.6 disulfonic acid to a so-called "intermediate" product and coupling the intermediate product thus obtained in an alkaline solution with one molecule of a suitable amidonaphtolsulfonic acid—such as 1.8.4 or 2.8.6 amidonaphtolsulfonic acid, 1.8.3.6 or 1.8.4.6 or 1.8.2.4 amidonaphtoldisulfonic acid. The dyestuffs thus obtained are alkaline salts of acids having the general formula

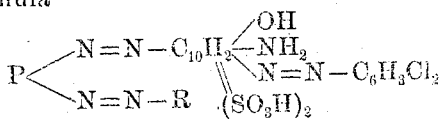

P representing the radical of the paradiamin—such as diphenyl, ditolyl, dimethoxydiphenyl, or the like, and R the amidonaphtolsulfonic acid.

In carrying out our process practically we proceed as follows: 34.1 kilos of the acid sodium salt of 1.8 amidonaphtol 3.6 disulfonic acid (one hundred per cent.) are dissolved in about four hundred liters of water containing five kilos of sodium carbonate and are then precipitated in a finely-divided state by the addition of thirty kilos of muriatic acid of 21° Baumé. The finely-divided paste thus obtained is then combined with the diazo compound prepared by diazotizing with 6.9 kilos of sodium nitrite an ice-cold solution of 16.25 kilos of dichloranilin ($NH_2$ : Cl : Cl = 1 : 2 : 5) in three hundred liters of diluted muriatic acid of 7.3 per cent. The combination is finished within about twelve hours, when by the well-known tests neither free diazo compound nor uncombined amidonaphtolsulfonic acid can any more be detected. The red-brown acid paste of this monoazo dye is then mixed with the tetrazo-diphenyl solution obtained in the well-known manner from 18.4 kilos of benzidin, and the resulting mixture, thoroughly stirred up, is afterward poured slowly into an ice-cold solution of eighty kilos of sodium carbonate in eight hundred liters of water. The combination begins at once, and after stirring for about one hour the black precipitate of the intermediate product thus obtained is then combined with the solution of 34.1 kilos of 1.8 amidonaphtol 3.6 disulfonic acid (one hundred per cent. acid sodium salt) in four hundred liters of water and four kilos of caustic soda. By stirring from time to time the combination is completed within about twenty hours. The dark-blue rather gelatinous mass is then heated up to boiling and the coloring-matter salted out in the heat by addition of twenty kilos of common salt, filtered and dried. In this example the 1.8 amidonaphtol 3.6 disulfonic acid used as second component may be replaced by equivalent weights of other suitable amidonaphtolsulfonic acids, such as 1.8.4 or 1.8.5 or 2.8.6 amidonaphtolmonosulfonic acid or 1.8.2.4 or 1.8.3.5 or 1.8.4.6 amidonaphtoldisulfonic acid. It may also be stated that the dichloranilin 1.2.5 can be substituted by the isomeric 1.2.4 or 1.3.4 dichloranilin and the benzidin by other paradiamins, as tolidin, dianisidin, ethoxybenzidin, and the like. The new trisazo dyes thus formed represent dark powders with a bronzelike luster, easily soluble with blue color in water, methylic alcohol, and also in strong sulfuric acid. Reducing agents—as, for instance, zinc-dust—in presence of soda-lye destroy the blue color, and by boiling the colorless solution thus obtained the characteristic strong smell of the dichloranilin distilling with steam will be observed.

The new trisazo color yields on unmordanted cotton in a neutral or slightly-alkaline bath and also on wool and silk in a neutral or acid bath in presence of Glauber salt or common salt greenish-blue to dark-blue shades.

Now what we claim, and desire to secure by Letters Patent, is the following:

1. The process for the production of new blue trisazo dyestuffs which consists in combining in an alkaline solution to a so-called "intermediate" product one molecule of a tetrazotized paradiamin with one molecule of the monoazo dye, resulting from the combination in an acid solution of one molecule diazodichlorbenzene with one molecule 1.8 amidonaphtol 3.6 disulfonic acid and coupling the intermediate product thus obtained with one molecule of an amidonaphtolsulfonic acid, substantially as set forth.

2. As a new article of manufacture a new blue trisazo dye derived from one molecule of a tetrazotized paradiamin, one molecule of the monoazo dye dichlorbenzeneazo 1.8 amidonaphtol 3.6 disulfonic acid and one molecule of an amidonaphtolsulfonic acid, representing dark powders with bronze luster, dissolving in water, methylic alcohol, and strong sulfuric acid with blue color, regenerating by reduction with zinc-dust and soda-lye dichloranilin and dyeing unmordanted cotton in blue shades, substantially as set forth.

In testimony whereof we have signed our names to this specification in the presence of two subscribing witnesses.

MELCHIOR BÖNIGER.
    JAN LAGUTT.

Witnesses:
 GEORGE GIFFORD,
 JOHN G. PLATNER.